Patented Apr. 17, 1945

2,373,953

UNITED STATES PATENT OFFICE 2,373,953

SALTS OF β-ERYTHROIDINE

Karl Folkers, Plainfield, and Randolph T. Major, Mountainside, N. J., assignors to Merck & Co., Inc., Rahway, N. J., a corporation of New Jersey No Drawing. Original application November 13, 1942, Serial No. 465,461. Divided and this application June 3, 1944, Serial No. 538,698

2 Claims. (Cl. 260—236)

This invention relates to a physiologically active alkaloid, and to processes for its production.

The alkaloid of the present invention exhibits a potent curare-like action, and has been found to be particularly useful for the release of spasm and plastic muscular rigidity in patients afflicted with spastic paralysis, and for modification of the severity of metrazol convulsions, thereby preventing fracture in the convulsive therapy of the psychoses. It is being used with notable success in the field of "shock therapy."

In a co-pending application, Serial No. 391,096, filed April 30, 1941, we have described a new Erythrina alkaloid which we have called "erythroidine." "Erythroidine" has the empirical formula $C_{16}H_{19}NO_3$, is a lactone which is susceptible to destruction by strong alkali, forms a crystalline hydrochloride melting at about 232° C., usually in the range of 223–232° C., and is a mixture of stereoisomers.

The present application is more particularly concerned with one of the stereoisomers of "erythroidine," which we have called β-erythroidine. β-Erythroidine is an alkaloidal substance which is a lactone and which, in its substantially pure form, has a melting point of about 99.5–100° C.; $(\alpha)_D^{25} = +88.8$, water.

According to our invention, β-erythroidine may be obtained by crystallization, preferably repetitive, of a salt or hydrohalide of the stereoisomeric mixture "erythroidine" from a solvent such as ethanol or methanol, and preferably absolute ethanol or methanol. A corresponding salt or hydrohalide of β-erythroidine is thus obtained. In some instances, such salt or hydrohalide may be obtained as a hemihydrate, or it may be accompanied by alcohol of crystallization, in which case the anhydrous form may be obtained by drying.

The base, β-erythroidine, may be recovered from such salt or hydrohalide by dissolving the latter in water, rendering the solution weakly alkaline, as for example by the addition thereto of sodium bicarbonate, and exhaustively extracting with a solvent such as chloroform, for instance.

It is, of course, possible to utilize the base β-erythroidine as starting material for the production of a wide variety of derivatives. The following derivatives are illustrative of those which may be produced either by treating the corresponding derivative of "erythroidine" as described, or by reacting the base, β-erythroidine, with appropriate reagents:

β-Erythroidine hydrochloride hemihydrate; M. P. 229.5–230° C. (decomp.).

β-Erythroidine hydrochloride, anhydrous; M. P. 232° C. (decomp.), $(\alpha)_D^{25} = +109.0$, water.

β-Erythroidine hydrobromide containing one-half molecule of ethanol; M. P. 227° C.

β-Erythroidine hydrobromide, anhydrous; M. P. 222.5° C.; $(\alpha)_D^{25} = +111.2$, water.

β-Erythroidine hydriodide, anhydrous; M. P. 206° C.; $(\alpha)_D^{25} = +108.1$, water.

β-Erythroidine perchlorate; M. P. 203–203.5° C; $(\alpha)_D^{25} = +96.3$, water.

β-Erythroidine flavianate; M. P. 216–216.5° C.

Alkali and alkaline earth metal salts of the acid corresponding to the lactone, β-erythroidine, may be obtained by treating said β-erythroidine in aqueous solution, with an appropriate alkalinizing agent as, for example, sodium hydroxide.

This application is a division of our co-pending application Serial No. 465,461, filed November 13, 1942, which is a continuation-in-part of our application Serial No. 233,412, filed October 5, 1938.

Modifications may be made in carrying out the present invention, without departing from the spirit and scope thereof, and we are to be limited only by the appended claims.

We claim:

1. The product obtained by treating β-erythroidine, in aqueous solution, with a substance selected from the group consisting of alkali and alkaline earth metal hydroxides, said β-erythroidine having the empirical formula $$C_{16}H_{19}NO_3$$

in its substantially pure form, being characterized by melting point about 99.5–100° C.; and $(\alpha)_D^{25} = +88.8$, water; and being identical with the β-erythroidine obtained from species of Erythrina.

2. The product obtained by treating β-erythroidine, in aqueous solution, with sodium hydroxide, said β-erythroidine having the empirical formula $C_{16}H_{19}NO_3$; in its substantially pure form being characterized by melting point about 99.5–100° C.; and $(\alpha)_D^{25} = +88.8$, water, and being identical with the β-erythroidine obtained from species of Erythrina.

KARL FOLKERS.
RANDOLPH T. MAJOR.